July 23, 1957 G. O. MORRISON 2,800,463
POLYVINYL ACETATE POWDER AND PROCESS OF MAKING THE SAME
Filed May 14, 1953
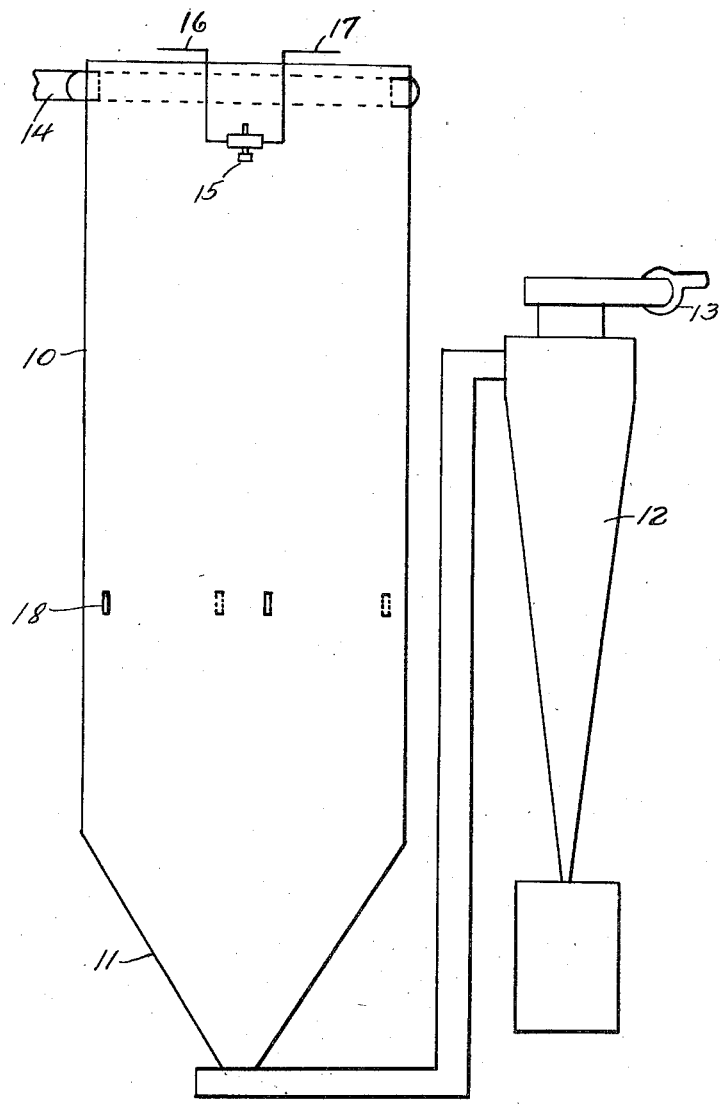
INVENTOR.
George O. Morrison
BY
Joseph Hirschman
ATTORNEY

2,800,463

POLYVINYL ACETATE POWDER AND PROCESS OF MAKING THE SAME

George O. Morrison, Milltown, N. J., assignor to Shawinigan Resins Corporation, Springfield, Mass., a corporation of Massachusetts Application May 14, 1953, Serial No. 354,912

18 Claims. (Cl. 260—29.1)

The present invention relates to powdered products obtained from aqeuous polyvinyl acetate emulsion compositions and characterized by the capacity for being re-emulsifiable or re-dispersible upon simple mixing with water to reconstitute substantially the same aqueous polyvinyl acetate emulsions as those from which the powders were manufactured, and to a process for manufacturing such re-dispersible powders.

The desirability of converting an aqueous polyvinyl acetate emulsion into a powder which can be reconverted into substantially the original emulsion on simply mixing with water, is obvious. Aside from saving in transportation costs because of the reduced weight, such a powder provides the further convenience to the user that he can make up only so much emulsion as is required to meet his immediate needs; also, he can make up fresh emulsions of different concentrations instead of keeping on hand a supply of different emulsions. The powder is less sensitive than the emulsion and can be stored without material change for long periods of time and under different conditions.

Despite the obvious desirability of such an emulsion powder, the same has heretofore not appeared on the market and the reasons for this are several. In the first place, the possibility of obtaining a dry, re-dispersible emulsion powder was contra-indicated by the known fact that polyvinyl acetate, unlike many other types of resins, absorbs water and tends to become tacky as it dries, so that it was to be expected that the particles would cohere in the process of drying and produce large aggregates which could not be re-suspended in water. Moreover, certain aqueous polyvinyl acetate emulsions, when applied as a film and dried, even at room temperature, are quite stable to water; i. e. they will not re-emulsify in water. It therefore seemed inevitable that this widely used type of emulsion, after being dried to a powder, would not be capable of redispersion and would thus behave similarly to a dry film thereof. It was also known that polyvinyl acetate lacked form-stability and tended to sinter and fuse at the temperatures usually employed in industrial spray drying and this factor appeared to militate further against the production of a powder composed of minute, discrete particles.

It is the general object of the invention to provide a powdery product composed essentially of the solid components of an aqueous polyvinyl acetate emulsion, such product being in such a state of subdivision and retaining the emulsifying components of the original emulsion in such condition that upon mixing with an amount of water approximately equal to that contained in the original emulsion, the emulsion is reconstituted with properties substantially identical with those of the original emulsion.

More specifically, it is an object of the invention to provide a dried and powdered product of the type indicated wherein the original polyvinyl acetate emulsion is one which has been prepared by polymerization of vinyl acetate in aqueous suspension.

It is a further object of the invention to provide a dried polyvinyl acetate emulsion powder from an aqueous polyvinyl acetate emulsion and composed of particles in such a fine state of subdivision that a stable emulsion can be reconstituted of the powder by mixing the same with water at room temperature and without the addition of further emulsifying agents and without non-dispersible residue or sediment even after long standing.

It is a still further object of the invention to convert aqueous polyvinyl acetate emulsions into dried, powdered form, the original emulsions being either of the type which yields a uniform and continuous but substantially non-redispersible film when spread upon a surface and dried even at room temperature, or of the type which in its original form yields films when spread upon a surface and dried at room temperature which can be re-suspended or re-dispersed in water; and to provide in particular a powdered emulsion of the first-mentioned type which can be re-dispersed in water to yield an emulsion which nevertheless is capable of forming smooth films which on drying are resistant to the action of water; and also powdered emulsions of the second type which are completely dispersible in water despite subjection to elevated temperatures during the process of manufacture.

It is in particular an object of the invention to provide a process whereby aqueous polyvinyl acetate emulsions which on drying in film form yield non-reemulsifiable films, can be converted into a dried powdered product which, despite the fact that it is quite as dry as or even drier than, the aforementioned film, is nevertheless re-dispersible into substantially the original emulsion condition upon mixing with water.

Other objects and advantages of the invention will appear from the following more detailed description thereof.

The low fusion temperature and dimensional instability of polyvinyl acetate have made it impossible to grind such resin to a fine powder, as can be done with many other resins, such as vinyl chloride polymer, for on grinding the granules of the resin the unavoidable rise in temperature causes the polyvinyl acetate to soften and form into a plastic lump.

The polyvinyl acetate emulsions currently on the market are of two general types which can be distinguished according to the re-dispersibility of a film of such commercial emulsions which has been dried in air. In one type of commercial emulsion which, when spread upon a surface in the form of a film and allowed to dry in air at room temperature, yields an adherent, continuous, protecting or decorative film which is resistant to the action of water and will not re-disperse in water to any marked extent, the average particle diameter of the bulk of the resin dispersed in the emulsion is about ½ to 1 micron. This resistance to the action of water is a characteristic of such film, despite the fact that it retains the original hydrophilic emulsifying material used in the preparation of the emulsion from which the films were made. When such films are heated to elevated temperatures, as to about 160–170° F. or higher, the resistance to re-dispersion in water is increased, especially in those films which previously had shown some dispersibility. The non-redispersibility is a function not only of the particle size but also of the quantity of emulsifier, as is set out in the patent to Henry M. Collins and George O. Morrison, No. 2,444,396, dated June 29, 1948.

The other type of commercial polyvinyl acetate emulsions is distinguished from the first mentioned type in that a dried film thereof is substantially completely dispersed when washed, rubbed, or stirred with water. However, when such films are heated to about 160–170° F., or higher, they are rendered at least partly non-redispersible. Commercial emulsions of this type consist for the major part of dispersed resin particles having diameters from about 2 to 5 microns.

It was, accordingly, quite unexpected that by a drying process involving the use of elevated temperatures, aqueous polyvinyl acetate emulsions generally could be converted into a dry, powder form from which the original emulsion could be substantially fully reconstituted upon simple mixing with the proper proportion of water, i. e., without the addition of emulsifying or similar agents. In view of the enormously greater surface of particles having a diameter of only several microns, it was to be expected that the influences which rendered a film of the first type of resin non-redispersible, would act even more effectively in this direction on a mass of minute particles; and that even in the second type of emulsion the water-resisting effect of heating on a continuous film of the original emulsion which rendered the film at least partly non-redispersible would be multiplied many times on the much greater surface area of the powdered emulsion.

The usual method of drying aqueous emulsions is by atomizing them in an atmosphere heated to temperatures of the order of 450° F. and even much higher. However, as I have found, aqueous polyvinyl acetate emulsions cannot be dried under these conditions if a re-dispersible product is to be obtained. As already mentioned, polyvinyl acetate absorbs water and tends to become tacky as it dries, especially at elevated temperatures. In fact, one of its major uses is as an adhesive. Also, because of its low dimensional stability, it tends to flow, so that contact between the particles as they dried would cause coalescence into particles too large for re-dispersion.

It will thus be seen that if an emulsion of the first type were spray-dried, so that in place of a continuous film, a multitude of individual, small particles of the solid components of the emulsion was obtained, such particles would be formed under conditions even less favorable to the preservation of re-dispersibility than a film of the original commercial emulsion dried in air; while as to the second type, it was apparent that any process involving the use of heat would destroy at least in part the capacity of the so-dried particles for regenegating the original emulsion; while, additionally, the normal tackiness of the resin particles in the presence of water, made the production of dry, discrete particles of the requisite small size and capable of re-dispersion appear impossible.

I have nevertheless found that if aqueous polyvinyl acetate emulsions prepared by polymerizing vinyl acetate in aqueous suspension with the aid of known polymerizing and emulsifying agents, are spray-dried with the aid of known apparatus but under such conditions that the particles, while heated, are not caused to sinter or fuse, the size of the dried particles being generally of the order of that of the particles dispersed in the emulsion, or capable of being disintegrated to the necessary state of subdivision on stirring in water, then even in the case of emulsions which produce non-redispersible films on drying of thin layers thereof, the spray-dried particles are characterized by the property of being readily re-dispersible into stable emulsion form on simple mixing with water at room temperature.

I have found further that such reconstituted emulsions are stable over long periods of time (six months and more), particularly where the solids compose about 50 to 55% of the emulsion, and that any sediment that forms is easily re-dispersible on stirring, so that the particles remain reversible and capable on re-suspension of producing a smooth and continuous film.

Powdered emulsions of substantially the same properties can also be obtained, as I have found, by freeze-drying the emulsions, provided that the emulsions are freeze-stable, and provided that the freezing takes place so rapidly that rupture with union of or bridging between the particles does not occur. Such freeze-dried emulsion powders have a considerably lower density than the spray-dried powders, but are as easily dispersible in water to reconstitute the original emulsions as are the spray dried products.

The polyvinyl acetate emulsions which can be reduced to a redispersible powder in accordance with the present invention are available on the market and are supplied by different manufacturers. They are manufactured, for example, by the processes described in the patents to Stark No. 2,227,163, and Wilson, Nos. 2,508,341 and 2,508,342, but my process is not limited to such emulsions.

The emulsions which are converted into powder form, in accordance with the present invention, are preferably prepared by polymerization of vinyl acetate, in known manner, in aqueous suspension with the aid, if desired, of a catalyst, and in the presence of emulsifying agents or of protective colloids like polyvinyl alcohol, gum tragacanth, gum acacia, gum arabic, and the like, with or without one or more wetting agents, as described in the aforementioned patents.

The powdered products of the present invention can be utilized in various ways. Thus, they can, as already indicated, be re-emulsified in water and utilized either in such form or by the addition of various materials, like plasticizers, pigments, etc. be employed for the manufacture of aqueous polyvinyl acetate emulsion paints, as well as thinners and sealers of similar composition. They can be employed also for the manufacture of adhesives for use in various industries in which polyvinyl acetate adhesives are now commonly employed. These latter uses as an adhesive include that in which the thermoplastic property of the polyvinyl acetate composition is taken advantage of in the heat-sealing of various wrappings and the like, after a film of the emulsion has been applied and dried.

A particular advantage of my improved product is in the field of manufacture of non-woven or bonded fabrics. As already mentioned it is impossible to grind polyvinyl acetate to a fine powder, for example to a degree of fineness required for sifting the same over a cotton or other base for the manufacture of an un-woven fabric by the application of heat to such a resin-covered and resin-interspersed base. The product of the present invention, on the other hand, provides a polyvinyl acetate composition in a fine state of subdivision which can be readily sifted over any suitable base and thereafter bonded to such base by means of heated cylinders or the like. The variations in the particle size in certain of my novel products is of advantage in such use as the finer particles will be deposited between the fibers of the base, while the larger particles will overlie them, so that complete penetration by the resin on fusing and thorough anchoring are assured.

The emulsion powders of the present invention, whether prepared by spray or freeze drying, are useful also for providing grease-resistance to various surfaces, for the preparation of "permanent starch," and as additions to already prepared adhesive compositions comprising aqueous polyvinyl acetate emulsion mixed with a plasticizing agent, as thereby the setting-up time for the adhesive film is considerably reduced without the need for partial drying of the applied film. Thereby considerable time can be saved in the bookbinding, woodworking and other industries as the adhesively treated articles can then be handled and transported very soon after the application of the bonding film, while in the woodworking industries the clamps can be removed earlier than heretofore.

As will be evident to persons skilled in the art, my powdered product can be utilized in various other ways in which powdered resins have heretofore been employed. Thus, the powdered resin can be mixed with various other types of resins; and also with fillers, extenders, plasticizers, etc., to adapt it for use for particular purposes. So far as I am aware, the products of the present invention represent the first form of polyvinyl acetate in which it is distributed in dry solid form in the particle size range set forth herein.

For different purposes, products having different average particle diameter ranges will be provided. For an average particle diameter of 2 to 5 microns, a polyvinyl acetate emulsion will be employed having suspended particles of substantially the same range of diameters for the bulk of the resin, these measurements (and likewise all other particle size measurements disclosed herein) being made on the particles visible under about 430 to 600 magnification. Similarly, for products having particle diameters of lower ranges, original emulsions will be employed having suspended particles of similarly lower diameter ranges.

In general, where particle diameters of the original commercial emulsion are preponderantly within the range of 2 to 5 microns, the films of both the original and the reconstituted emulsions which have been dried at room temperature will generally be reemulsifiable on rubbing or other contact with water; while commercial emulsions wherein the particle diameters are preponderantly about 1 micron, the films made of the original as well as of the reconstituted emulsions will not be re-emulsifiable on rubbing or other contact with water, i. e., such films will be irreversible.

The GELVA Emulsion S55 described and used in Examples 2 and 3 below is typical of the first mentioned type of emulsion; while GELVA Emulsion TS30 used in Examples 1 and 4 below is typical of the second type of emulsion. This emulsion contains particles with average diameters of ¾ to 1 micron and is prepared by the method described in U. S. Patent No. 2,508,342 to Wilson.

As above indicated, the powdered re-emulsifiable polyvinyl acetate emulsions of the present invention can be prepared also by freeze-drying processes which themselves are known. It is desirable, however, to effect the initial freezing very rapidly on relatively thin layers of the emulsion and at temperatures not substantially higher than −40° F. The freezing should be accomplished, for best results, in less than 10 seconds and preferably in less than 5 seconds. The freeze-drying process can be applied either to the original aqueous polyvinyl acetate emulsion containing 50 to 55% of solid material or to a diluted form of such emulsion. The frozen masses of aqueous polyvinyl acetate emulsion are then subjected in known manner to evaporation from the solid state under a high vacuum, while maintaining the same in the frozen or solid condition. Sufficient heat can be applied to provide the latent heat of evaporation, so as thereby to speed up the drying process. This drying can be conducted by either a batch process or continuously.

My powdered products are preferably manufactured continuously by spray-drying. As is common in such processes, the emulsion is disintegrated into fine particles by atomizing the same in a stream of air. The current of atomizing air should be of such high velocity relative to that of the stream of emulsion as to be capable of atomizing the emulsion into particles or globules consisting in large part substantially of the individual solid emulsion particles with an envelope of the suspending medium (water with emulsifying agent) about them. This two-fluid atomization is well understood in the art, and it will be apparent that the relative velocities between the two fluids will be so chosen as to produce the requisite degree of disintegration of the emulsion depending upon the sizes of the suspended particles in the emulsion. Where the original emulsion has a high solids content, say from 50 to 55%, it is desirable to dilute it to about 15 to 35% solids, with or without moderate preheating, say up to 140–150° F.

The maximum air inlet temperature will depend largely on the particle or globule size of the atomized emulsion. With finer atomization, higher inlet temperatures can be used, while for coarser atomization such maximum temperatures must be kept lower. The best inlet and outlet air temperatures for a particular emulsion and degree of atomization can be determined by simple experiment, the principal test being the re-dispersibility of the dried powder. Thus on spray-drying a GELVA Emulsion S55 with an air inlet temperature 200° F. and outlet temperature of about 120° F., the dry particles of diameter of 2–3 microns were free from glaze under the microscope (430 ×) and were completely re-dispersible, while particles of about 7–10 microns diameter had a glazed surface and were at least in large part non-redispersible. On the other hand, an emulsion spray-dried with an air inlet temperature of 160–170° F. and with outlet air temperature of 115–120° F., gave particles of the same ranges of diameters but they had no glazed surface and were all both readily and completely re-dispersible. When the atomization is fairly uniform and yields a very fine spray (producing on drying a mass of particles which on re-dispersion regenerate substantially the original emulsion), the inlet drying air temperature can be higher than 200° F. The temperature of the dried particles should, however, not reach their sintering temperature, and to this end, cool air may be charged into the drier adjacent to its discharge end.

A spray-drying apparatus suitable for the manufacture of polyvinyl acetate emulsion powders in accordance with the present invention is illustrated on the attached drawing. The drier consists of a cylindrical shell or chamber 10, having a cone-shaped bottom section 11 connected through a cyclone separator 12 to an exhaust fan 13. At the top of the drier there are disposed an inlet for introducing heated drying air through a suitable conduit 14, and also a two-fluid nozzle 15 having a compressed air connection 16 and a conduit 17 for the supply of the aqueous emulsion. Near the discharge end of the drier there is connected an air conduit 18 for supplying cooling air at approximately the region where the particles have become thoroughly dry, so as to prevent heating of the particles to the sintering of fusion temperature.

The two-fluid nozzle can be of different types, such as one to which the aqueous emulsion is charged at a pressure head of several feet. It can however, also be of the type which draws in the aqueous emulsion by suction. A suitable two-fluid nozzle arrangement is one consisting of fluid nozzle 2050 and air nozzle 64, as described in catalog 23 of Spraying Systems Company of Bellwood, Ill. The pressure of the air charged to the nozzle can be varied between about 40 and 80 lbs., depending upon the degree of atomization required, the feed of the emulsion in this case being under a 36–40 in. syphon. The commercial emulsions are preferably diluted to a solids content of about 20%.

Satisfactory powders were obtained with a drier of the type above described, having a drying chamber about 30 in. in diameter and about 8 ft. long, the exhaust fan had a capacity of about 200 cu. ft. per minute and the feed of the diluted commercial emulsion (20% solids) averaged approximately 0.4 gallon per hour. The inlet temperature of the drying air varied between 160 and 170° F. and the outlet air temperature varied between 115 and 120° F. Driers of considerably larger size can of course be employed, in which case the nozzle, fan, etc. will be correspondingly proportioned. With this drier under the conditions indicated GELVA Emulsions TS30 and S55, referred to above, both gave dry powders which were easily dispersed on mixing with water.

In the following examples, procedures for carrying out the present invention are presented in greater detail, but the same are to be understood as being presented only for purposes of illustration and not as indicating the scope of the invention:

*Example 1*

A commercial aqueous polyvinyl acetate emulsion (GELVA Emulsion TS30, 55% solids content) was spray dried by atomizing a stream of the diluted emulsion in an atomizing nozzle with the aid of air charged at a pressure of about 60 lbs./sq. in. The atomized emulsion was discharged into a chamber which was supplied with drying air at a temperature of 160° F., the air leaving the chamber at about 120° F. The dry powder was obtained at an apparent density of about 30 lbs./cu. ft. Under 430 magnification the greater part of the resin by weight consisted of particles having a diameter of about 2 to 3 microns, and of these, many were of spherical shape. In the original emulsion, the diameters were ¾ to 1 micron.

A part of the mass was composed of particles ranging in diameter from 8 to 10 microns and from 15 to 20 microns, some of the particles in both of these groups being of irregular shape and appearing corrugated.

The original emulsion was of the type which dried to a clear film at room temperature, and on being subjected to the action of water, became white and softened to some extent, but showed only slight to no re-dispersion; and when the clear film was heated at 170° F. for half an hour, it remained clear, and on being rubbed with water, showed some whitening but no re-dispersion. The films prepared with a reconstituted emulsion made with the spray-dried powder had, both prior to and after the heating practically the same properties as the film made with the original emulsion.

When this spray-dried product was heated for 10 minutes at 115° F., it lost more or less completely its capacity for forming a stable emulsion. The properties of the reconstituted emulsion made with the dried powder (55% solids) were very similar to those of the original 55% emulsion, despite the fact that during the spray-drying, the emulsion had been subjected to a temperature of 160° F. Thus, like the original emulsion, the reconstituted 55% emulsion was uniform in appearance (after 2 hours' standing) with no settling. After one month's standing, there was a slight top clear water layer in the reconstituted emulsion, but otherwise the reconstituted emulsion was just as satisfactory as the original emulsion. On stirring, the emulsion became uniform again.

The reconstituted 20% emulsion likewise compared very favorably with the diluted original emulsion of the same concentration, there being no clear layer visible after 2 hours' standing; while after 48 hours' standing, the reconstituted emulsion showed only a 2% clear layer to 1% for the original emulsion.

The sedimentation after 2 and 48 hours' standing amounted respectively to 1% and 5% for the reconstituted emulsion compared with 0% and 3% for the original emulsion of similar concentration. In both cases the sediment could be re-dispersed very easily by stirring, so that the reversibility of the particles continued unchanged, the particles thus remaining stable.

In the case of a 2% solids dispersion, both the original and reconstituted emulsions showed after 1 hour's standing only a slight sedimentation with a milky water layer; stirring made the emulsions completely uniform.

*Example 2*

A polyvinyl acetate emulsion (GELVA Emulsion S55), and having a polyvinyl acetate content of 55%, the major portion of which was in the form of particles having a diameter of from 2 to 3.5 microns, the emulsifying agent being hydrolyzed polyvinyl acetate, was atomized with a high velocity air current in a suitable nozzle by the two-fluid process. The emulsion had been previously diluted to a 20% solid content. The atomized emulsion was discharged into a chamber charged with heated air having an inlet temperature of 170° F. and an outlet temperature of about 125° F. The dried product had an apparent density of about 30 lbs./cu. ft. and consisted for the greater part of its weight of particles having a diameter of 2 to 3 microns, many of which were spherical in shape; while a portion of the particles had a diameter of about 10 to 20 microns, some of such particles being irregular in shape, while others appeared corrugated, and a few were spherical, the measurements being made at a magnification of 430 diameters. On re-dispersion to a 55% solids emulsion, the particle sizes compared favorably with those of the original emulsion. The original emulsion was of the type which re-dispersed completely when a film thereof, dried at room temperature, was subjected to the action of water, and the spray-dried powder obtained as above described similarly re-dispersed completely.

An emulsion could be easily formed from the spray-dried powder by simple mixing with water, and a dispersion containing 55% solids was practically identical in appearance with the original emulsion both after 2 hours and after 1 month, the dispersions in both cases being uniform and showing no signs of settling. In the case of a reconstituted dispersion containing only 20% solids, a comparison with a similarly diluted original emulsion showed that neither exhibited a clear layer after 2 hours' standing. After 48 hours' standing, the original emulsion (diluted to 20% solids) showed a clear layer to the extent of about 1% of the depth of the emulsion, while that of the reconstituted emulsion (similarly diluted to 20% solids), showed a clear layer to the extent of about 2%. The reconstituted emulsion showed a higher degree of sedimentation after two hours than the corresponding original emulsion; that for the latter, after 48 hours' standing, amounted to about 5%, and for the reconstituted emulsion about 30%; but in both cases it was very easy to re-disperse the sediment upon further stirring. Both dispersions at 2% solids concentration showed, after about 1 hour's standing, some sedimentation and a milky aqueous layer, the emulsion being, however, easily made uniform by stirring in both cases.

The temperature at which the dried powder lost more or less completely its capacity for forming a stable emulsion on heating for 10 minutes, was about 160° F.

The characteristics of films laid down with the reconstituted emulsions compared favorably with that obtained with the original emulsion of similar solids concentration, being in both cases smooth and fairly clear, although slightly hazy. Both films are emulsified completely on rubbing with water. After heating at 175° F. for about a half an hour, both films remained smooth, although slightly hazy, and both re-emulsified in water to a considerable extent, although not completely.

*Example 3*

The same commercial emulsion as was employed in Example 2, was freeze-dried both with 55% solids content, and with such emulsion diluted to 25 to 45% solids content. The emulsion was contained in shallow trays to a depth of 1/16 to ¼ inch and was subjected to a temperature of about minus 40° F. The frozen masses were then evaporated under a vacuum of about 25 to 200 microns of Hg, sufficient heat being provided to supply the latent heat of evaporation without causing thawing of the ice. There was obtained a powder having an apparent density of about 45 lbs./cu. ft. in the case of the 55% emulsion. The greater part of the mass of resin had a particle diameter of about 2 to 3 microns, many of which were of spherical shape; while a smaller weight of the particles had an average particle diameter of about 15 to 20 microns, many of these being of very irregular shape and of corrugated surface as visible under 430 magnification. When reconstituted in the form of a 55% emulsion the freeze-dried particles gave a uniform emulsion which showed no settling after standing for more than a month.

In the form of a reconstituted emulsion, diluted from 55% to 20% solids, there was, as in the case of the spray-dried material, no clear layer after 2 hours, while after 48 hours, a clear layer amounted to only about 1%. The sedimentation after 2 and 48 hours, respectively, was lower than in the case of the spray-dried material, being 1% and 10% respectively, as compared with 2% and 30% for the spray-dried material. As in the case of the latter, the sediment depositing after 48 hours could be very easily dispersed by simple stirring. The characteristics of a reconstituted emulsion diluted to 2% solids and made with the freeze-dried powder, were similar to those of the corresponding reconstituted emulsion (of the same solids content) prepared with the spray-dried powder. The temperature at which the powder lost its capacity for re-dispersion on heating for 10 minutes again was about 160° F. The characteristics of films made with reconstituted emulsions of the freeze-dried powder were not distinguishable from those laid down with the corresponding emulsions prepared with the spray-dried powder, and the same was true of the film characteristics after heating at 175° F. for half an hour.

*Example 4*

The emulsion of Example 1 was diluted and freeze-dried in the manner described in Example 3. The powder so obtained had an apparent density of about 45 lbs./cu. ft. consisting for the most part of particles having a diameter of about 2 to 3 microns, very many of which were spherical in shape, while a portion of them had a diameter of about 10 to 20 microns, a few of which were very irregular and corrugated. The properties of the reconstituted emulsions prepared with the freeze-dried powder were substantially identical with those of the spray-dried powder obtained according to Example 1, except that the reconstituted 55% solids emulsion showed no clear water layer even after one month's standing, while no sediment appeared in the reconstituted emulsion diluted to 20% solids after standing for 2 hours. The properties of the freeze-dried material were thus slightly better in these two respects than those of the spray-dried powder.

I prefer to employ emulsions for spray drying which are substantially free from plasticizers for the polyvinyl acetate. Such plasticizers can be added to the re-constituted emulsion along with other materials designed to make the emulsion suitable for particular uses, as is well understood in the art. However, the present invention does not exclude emulsions containing a plasticizer, but in such cases the sintering temperature will be reduced to a degree depending upon the type and quantity of plasticizer or other additions so as to keep the maximum temperature which the particles attain during the spray-drying process somewhat below such sintering temperature. The plasticizers can be those generally employed for polyvinyl acetate and include dibutyl and other dialkyl phthalates, butyl phthalyl butyl glycolate, dibutyl sebacate, tricresyl phosphate, etc.

Both the spray-drying and the freeze-drying must be effected so rapidly that the particles do not "invert," i. e., become irreversible, which is probably due to the film of emulsifying agent becoming entrained within the polyvinyl acetate, so that the emulsifier is prevented from acting.

While the drying air temperature in the spray-drying process can be considerably above the temperature at which the polyvinyl acetate particles sinter because of the large amount of heat absorbed in the vaporization of the water phase, it should not be so high nor act for so prolonged a time that the temperature of the particles rises to their sintering point before they are discharged from the drier. As already indicated, with a finer spray, a higher air inlet temperature may be used because of the more rapid evaporation, and in such case it may be as high as 250° F. The drying air temperature must accordingly be correlated to the size of the atomized globules and also with the degree of dilution of the emulsion. The air outlet temperature may be as low as room temperature or approximately so, say 100° F., but is preferably no lower than 115° F. The best products are those which are practically entirely free from particles having a glazed or shiny smooth surface, and the complete regeneration of the original emulsions is most readily obtained with products having particles with corrugated, convoluted, or generally irregular surfaces as viewed under 430 magnification.

The cakes obtained on freeze-drying can be broken down in micro-pulverizer. They are composed of loosely-bound particles which separate on rubbing or on agitation with water.

The speed with which the powdered products of the present invention will re-disperse will depend in large part on the nature of the emulsifier contained in the original emulsion. Thus with polyvinyl alcohol as the emulsifier, the speed of re-dispersion will be slower than with gum arabic, but in any case a few minutes' stirring will be sufficient.

I claim:

1. Process for converting aqueous polyvinyl acetate emulsions into a powder form which is capable of being re-dispersed in water to reconstitute substantially completely the original emulsion, which comprises atomizing an aqueous polyvinyl acetate emulsion containing a small proportion of an emulsifying agent and wherein the bulk of the polyvinyl acetate is in the form of particles having a diameter of less than 5 microns, into emulsion globules which, on drying, leave a powder composed largely of particles of a diameter up to 5 microns and aggregates of said particles, and subjecting the atomized spray of emulsion to evaporation at elevated temperatures not exceeding 250° F.

2. Process according to claim 1 wherein the drying is effected with the aid of air having an initial temperature of about 170° F. and a final temperature of about 120° F.

3. Process according to claim 1, wherein the atomized emulsion globules are of a size which, on drying, leave solid particles having an average diameter of the order of that of the suspended particles.

4. Process according to claim 1, wherein the emulsion contains from 10 to 35% solids.

5. Process for converting aqueous polyvinyl acetate emulsions into a powder form which is capable of being re-dispersed in water to reconstitute substantially completely the original emulsion, which comprises atomizing an aqueous polyvinyl acetate emulsion containing a small proportion of an emulsifying agent and wherein the bulk of the polyvinyl acetate is in the form of particles having a diameter of ½ to 1 micron into emulsion globules which, on drying, leave a powder composed largely of particles of a diameter up to 5 microns and aggregates of said particles, subjecting the atomized spray of emulsion to evaporation in a current of heated air having an inlet temperature of at least about 160° F., but below the particle-sintering temperature, and having an outlet temperature lower than said inlet temperature, but no lower than 100° F.

6. Process according to claim 5, wherein the outlet temperature of the drying air is about 115–120° F.

7. Process according to claim 5, wherein the emulsion contains from 10 to 35% solids.

8. Process according to claim 5, wherein the emulsion contains about 20% solids.

9. Process for converting aqueous polyvinyl acetate emulsions into a powder form which is capable of being re-dispersed in water to reconstitute substantially completely the original emulsion, which comprises atomizing an aqueous polyvinyl acetate emulsion containing a small proportion of an emulsifying agent and wherein the bulk of the polyvinyl acetate is in the form of particles having a diameter of 2 to 3.5 microns, into emulsion globules which, on drying, leave a powder composed largely of particles of a diameter up to 5 microns and aggregates of said particles, and subjecting the atomized spray of emulsion to evaporation in a current of heated air having an inlet temperature of at least about 160° F., but below the particle-sintering temperature, and having an outlet temperature lower than said inlet temperature, but no lower than 100° F.

10. Process for converting aqueous polyvinyl acetate emulsions into a powder form which is capable of being re-dispersed in water to reconstitute substantially completely the original emulsion, which comprises quickly freezing an aqueous polyvinyl acetate emulsion containing a small proportion of an emulsifying agent and, the bulk of whose particles have a diameter of less than 5 microns, and evaporating the frozen emulsion while maintaining the same in the frozen condition until a dry, powdered material is obtained which is dispersible on mixing with water alone to form an emulsion having substantially the same particle size as the original emulsion.

11. Process according to claim 10, wherein the freezing of the emulsion is effected at a temperature of about minus 40° F. and in less than 5 seconds.

12. Process according to claim 10, wherein the bulk of the particles of the emulsion have a diameter of about ½ to 1 micron.

13. Process according to claim 10, wherein the bulk of the particles of the emulsion have a diameter of about 2 to 3.5 microns.

14. A dry polyvinyl acetate powder derived from an original aqueous emulsion and containing original emulsifying agent dispersed throughout the powder, the powder containing the original emulsion particles in unsintered form, and the powder being composed largely of particles of a diameter up to 5 microns and aggregates of said unsintered particles, said powder being redispersible on mixing with water.

15. An emulsifiable polyvinyl acetate powder according to claim 14, wherein a film of the re-formed emulsion leaves, on drying in air at room temperature, a uniform and continuous coating which is non-redispersible in water, the greater part by weight of the powder consisting of particles having a diameter of about 2 to 3 microns.

16. An emulsifiable polyvinyl acetate powder according to claim 14, wherein a film of the re-formed emulsion leaves, on drying in air at room temperature, a uniform and continuous coating which is re-dispersible in water, the greater part of the weight of the powder consisting of particles of a diameter of about 2 to 3 microns.

17. An emulsifiable polyvinyl acetate powder, according to claim 14, wherein a film obtained with the re-formed emulsion and dried in air at room temperature is non-redispersible in water.

18. An emulsifiable polyvinyl acetate powder according to claim 14, wherein a film obtained with the re-formed emulsion and dried in air at room temperature is re-dispersible in water.

References Cited in the file of this patent

UNITED STATES PATENTS

| | | |
|---|---|---|
| 626,182 | Marsden | May 30, 1899 |
| 2,290,794 | Alvarado et al. | July 21, 1942 |
| 2,355,919 | Lipsius | Aug. 15, 1944 |
| 2,371,618 | Hanson et al. | Mar. 20, 1945 |
| 2,392,135 | Farr | Jan. 1, 1946 |
| 2,444,396 | Collins et al. | June 29, 1948 |
| 2,462,354 | Brubaker et al. | Feb. 22, 1949 |
| 2,508,341 | Wilson | May 16, 1950 |
| 2,585,967 | Schibler | Feb. 19, 1952 |
| 2,671,065 | Ulrich | Mar. 2, 1954 |

OTHER REFERENCES

Bennett; Concise Chemical and Technical Dictionary, 1947, page 570.